(12) United States Patent
Stukenholtz et al.

(10) Patent No.: US 6,358,141 B1
(45) Date of Patent: Mar. 19, 2002

(54) COMBINE SYSTEM FOR HARVESTING, CLEANING AND STORING BOTH CORN KERNELS AND WHOLE COBS, AND METHOD OF USE

(76) Inventors: Ty E. Stukenholtz; Jay E. Stukenholtz, both of 6296 Q Rd., Nebraska City, NE (US) 68410

( * ) Notice: Subject to any disclaimer, the term of this patent is extended or adjusted under 35 U.S.C. 154(b) by 0 days.

(21) Appl. No.: 09/575,224

(22) Filed: May 22, 2000

Related U.S. Application Data

(60) Provisional application No. 60/131,573, filed on Apr. 29, 1999.

(51) Int. Cl.⁷ ............................. A01F 12/48; B07B 1/50; B08B 5/00
(52) U.S. Cl. ........................................ 460/100; 460/111
(58) Field of Search ............................. 56/51, 60, 14.6; 460/100, 111, 114, 97, 98, 99, 119, 903, 44, 23

(56) References Cited

U.S. PATENT DOCUMENTS

| 2,484,999 A | | 10/1949 | Hyman | |
| 3,213,601 A | | 10/1965 | Rowland-Hill | |
| 3,556,108 A | | 1/1971 | Knapp | 460/97 |
| 3,580,258 A | | 5/1971 | Stroburg | 460/100 |
| 3,680,291 A | | 8/1972 | Soteropulos | 56/14.3 |
| 4,051,856 A | * | 10/1977 | Reed et al. | 460/98 |
| 4,188,160 A | | 2/1980 | Corbett et al. | 406/58 |
| 4,250,897 A | * | 2/1981 | Glaser | 460/69 |
| 4,265,077 A | * | 5/1981 | Peters | 56/14.6 |
| 4,291,521 A | * | 9/1981 | Haake | 56/13.5 |
| 4,344,443 A | | 8/1982 | De Busscher et al. | 460/97 |
| 4,412,549 A | * | 11/1983 | Rowland-Hill | 460/100 |
| 4,471,788 A | * | 9/1984 | Meier et al. | 460/29 |
| 4,600,019 A | * | 7/1986 | McBroom | 460/101 |
| 5,015,997 A | * | 5/1991 | Strubbe | 340/684 |
| 5,256,106 A | * | 10/1993 | Shrawder | 460/39 |
| 5,624,315 A | * | 4/1997 | Jonckheere | 460/99 |
| 5,873,227 A | * | 2/1999 | Arner | 56/14.6 |
| 5,941,768 A | * | 8/1999 | Flamme | 460/114 |

FOREIGN PATENT DOCUMENTS

| DE | 4143244 | * | 7/1993 | ............ A01F/12/44 |
| JP | 6-276844 | * | 6/1994 | ............ A01F/12/48 |

* cited by examiner

Primary Examiner—Robert E. Pezzuto
Assistant Examiner—Árpád Fábián Kovács
(74) Attorney, Agent, or Firm—James D. Welch

(57) ABSTRACT

A combine system which includes at least two on-board bins in combination with associated equipment for harvesting ears of corn, separating corn kernels from cobs, and directing the corn kernels and whole cobs to separate bins for accumulation therein.

10 Claims, 8 Drawing Sheets

COMBINE SYSTEM FOR HARVESTING, CLEANING AND STORING BOTH CORN KERNELS AND WHOLE COBS, AND METHOD OF USE

This Application is a CIP of Provisional Patent Application Serial No. 60/131,573 Filed Apr. 29, 1999.

TECHNICAL FIELD

The present invention relates to systems and methods for harvesting and cleaning ears of corn, and more particularly to a combine system which comprises a plurality of bins in combination with means for harvesting corn, shelling corn kernels from cobs, and directing the corn kernels and whole cobs to separate bins for accumulation therewithin.

BACKGROUND

It is first noted that ears of corn comprise cobs upon which are present corn kernels, and that accompanying materials other than cobs and kernels of corn, (which are entered to a combine system during harvest), are herein collectively termed "unavoidable chaff", although the terminology "stover", (whole cobs, it is noted, can be termed "stover" where said whole cobs are considered as part of said unavoidable chaff), is applicable to describing the larger elements in "unavoidable chaff". It is also noted that the terminology "whole cobs" is to be understood to refer to cobs from which corn kernels have been removed by shelling, which are not intentionally broken or ground-up, and which can be separated from co-mingled unavoidable chaff by a flow of air of appropriate velocity.

It is also noted that there are two basic types of combines, "Conventional" and "Rotary". Conventional combines comprise a "Straw-Walker" which serves to carry cobs and chaff to a straw-chopper/ejection mechanism, while allowing corn kernels to drop therethrough to a sieve, through which sieve they fall prior to being directed to a storage bin therefore. Rotary combines do not include a straw-walker but instead provide a rotor mechanism which serves to direct corn kernels to a sieve, while projecting cobs and chaff to ejection means. In both rotary and straw-walker (conventional), machines the straw chopper/ejection serves to direct cobs and chaff to a cob cleaning system.

In the past corn crops were harvested by picking ears of corn, transporting said ears to a remote accumulation location, and later shelling the corn kernels from the cobs using a shelling machine. While this approach enabled convenient collection of both corn kernels and cobs, it was time consuming and accumulation/storage of the cobs over time often led to problems such as associated with predisposition toward rodent infestation.

A presently more typical approach to harvesting corn involves driving a combine system through a field, which combine system operates to pick ears of corn, then separate corn kernels from the cobs, (ie. perform "shelling" on the spot), while accumulating the corn kernels in a bin on said combine system. Said presently more typical approach to harvesting corn, however, usually provides that the cobs be discharged and left to decompose in the field, thereby resulting in loss of a valuable commodity.

While prior art systems are known which operate in the field to shell corn kernels from cobs and direct the resulting corn kernels and the cobs into separate bins, some thereof provide that the bin for storing cobs be mounted on a trailer pulled by a combine system during harvest. It should be readily apparent that said trailer implemented systems can be difficult to use as the presence of the trailer complicates maneuvering of the combine system. As well, some systems are known which grind-up cobs and deliver both corn kernels and ground-up cobs to a single bin mounted on a combine system. Said approach, however, leads to problems in that combination corn kernels and ground-up cobs can't be sold to grain elevators as-is.

A Search of Patents has provided a Patent to Hyman, U.S. Pat. No. 2,484,999 which describes a tractor mounted system comprising two compartments. The first compartment is arranged to receive corn shelled by a shelling rotor, and the second is arranged to receive shelled corn from husks and cobs etc. and from the first compartment. Stripped cobs are delivered outwardly and laterally from the tractor.

A Patent to Rowland-Hill, U.S. Pat. No. 3,213,601 describes two grain tanks affixed to either side of a combine. In use grain is distributed substantially equally into the two grain tanks to maintain combine balance.

A Patent to Soteropulos, U.S. Pat. No. 3,680,291 describes a corn harvesting machine that provides means for shelling and storing corn kernels, means for severing corn stalks from the ground and chopping them along with husks and cobs. The chopped stover can then be either deposited on the ground or stored in an adjacent tank, optionally in combination with cracked grain.

U.S. Pat. No. 4,188,160 to Corbett et al., describes a feed residue saver attachment which is affixed to a combine. The feed residue saver attachment can be operated to substantially save all feed residue including chaff, or to save only substantially large materials such as corn cobs, corn husks and pieces of stalk while permitting fine materials to drop to the ground. By inspection of the Corbett et al. system the Inventors estimate that it would retain approximately all chaff, but expel approximately seventy-five percent of all cobs which are transported over the straw walkers to the surrounding field.

A Patent, U.S. Pat. No. 5,256,106 to Shrawder describes a combine which is modified to reduce corn cobs to usable segments by changing the "combine arc" to circular, adjusting clearance and altering bar spacing and straw-walker sieve slots, and adding a cob conveyer adjacent to a cleaning shoe.

The present invention, in contrast to known prior systems does not intentionally break or grind cobs, and provides whole cobs and chaff to a sieve for separation of whole cobs leading to their eventual storage, with chaff being discharged.

Even in view of prior art, a need remains exist for a combine system which on-board comprises a plurality of bins, and which further comprises means for shelling corn kernels from cobs in the field, and accumulating the resulting corn kernels and cobs into said different on-board bins.

DISCLOSURE OF THE INVENTION

In addition to the methodology of its use, the present invention comprises a system for cleaning whole cobs, from which essentially all corn kernels have been removed, (shelled), of any accompanying unavoidable chaff. The present invention also comprises combine systems to which are directly mounted a plurality, (typically two), of bins in combination with means for shelling corn kernels from cobs and directing resulting corn kernels, and resulting cobs, to separate bins such that during a harvesting procedure, one of said bins is caused to accumulate primarily corn kernels and the other primarily "whole cobs", (ie. cobs which are not intentionally broken into pieces or ground-up). Note, as will be better described directly, the present invention preferably utilizes a flow of air of appropriate velocity to separate "whole cobs" from chaff, which "whole cobs" and chaff are placed atop a sieve through which said air flows. If corn cobs become broken-up said separation approach becomes progressively less workable, with ground-up cobs being indistinguishable from unavoidable chaff. Hence, in that light the terminology "whole cobs" is to be interpreted to mean corn cobs which are not intentionally broken-up or ground-up, but does not mean that corn cobs that are not "completely whole" are excluded. That is, broken corn cobs which can be separated from chaff by an air flow of appropriate velocity are to be considered within said terminology "whole cobs".

It is to be understood that Conventional combines comprise means for entering ears of corn and unavoidable chaff into a shelling means, which shelling means serves to remove corn kernels from their cobs. The resulting mix of corn kernels, cobs and unavoidable chaff is then entered onto a "Straw-Walker" which is constructed to allow corn kernels to fall therethrough onto a sieve through which they pass in transport to a collection bin. The cobs, (including "whole cobs"), and unavoidable chaff, (including small pieces of broken cobs), are typically then transported by the Straw-Walker to straw chopper/ejection means. The present invention modifies Conventional combines in one of two ways:

1. The Straw-Walker is modified to allow not only corn kernels to pass therethrough and arrive atop said sieve, but to also allow the cobs from which the corn kernels are removed to do likewise. This approach involves increasing the size of openings in the Straw-Walker, (which causes concern in some Conventional combine owners). Where this approach is acceptable the present invention provides that corn kernels proceed as in unmodified Conventional combines and that cobs, (which remain essentially whole through the shelling procedure), arriving at the top of said sieve, through the modified Straw-Walker, be caused to move across the top of said sieve into a means for causing transport thereof (eg. a cross-auger), into a second flow of air which causes said whole cobs to be transported into a cob storage bin. Air flow through the sieve is selected to be of a velocity such that unavoidable chaff which also falls through the Straw-Walker, is caused to be ejected from the Conventional combine thereby.
2. The Straw-Walker is typically not modified, but rather said straw chopper/ejection means is modified such that whole cobs and unavoidable chaff caused to arrive thereat by said Straw-Walker are directed to arrive atop an added, second sieve positioned inside the combine, through which second sieve is caused to flow an air flow at a velocity appropriate to cause said unavoidable chaff to be ejected from the Conventional combine, while whole cobs are allowed to fall through said added second sieve and into a transport means (eg. a cross-auger), which transports them into another air flow which causes transport thereof into a cob storage bin. This embodiment can also include a recycling mechanism for directing whole cobs which do not fall through said second sieve during a pass over the surface thereof. The major modification of the standard straw-chopper/ejection means in this embodiment involves reversing the direction of rotation of the straw chopper/ejector motor so that instead of causing whole cobs and unavoidable chaff to be ejected from said Conventional combine, said whole cobs and unavoidable chaff are directed back into the Conventional combine and onto the surface of said added second sieve.

The second embodiment is often preferred by Conventional combine owners who are reluctant to allow the standard Straw-Walker therein to have holes entered thereinto of a size which allows whole cobs to fall therethrough in use.

Where Rotary combines are utilized, under teachings of the present invention, the standard sieve through which corn kernels normally fall can be used as the sieve upon which said whole cobs and unavoidable chaff are caused to be directed, or a second sieve can be added and said whole cobs and unavoidable chaff can be directed thereonto. In either case, an air flow is caused to flow through the utilized sieve such that unavoidable chaff is led to be ejected from the Rotary combine. Where the first approach is utilized, whole cobs are guided over the top of said sieve and into a transport means (eg. a cross-auger), which transports them into another air flow which causes transport thereof into a cob storage bin. Where a second sieve is added, whole cobs are allowed to fall therethrough and into a transport means (eg. a cross-auger), which transports them into another air flow which causes transport thereof into a cob storage bin. As in the case where the second sieve is added in a Conventional combine, a recycling means can be implemented to provide whole cobs that do not fall through the second sieve during a first pass thereover, back onto the surface thereof.

Continuing, during use of the present invention system then, a present invention equipped combine system is driven through a field of corn to be harvested, and ears of corn are entered to the combine system, along with unavoidable chaff, (eg. corn husks and stalks etc.). Corn kernels are shelled from the cobs by routine shelling systems and procedures, and then fed atop a sieve through which they are allowed to fall and are directed to the end that they are entered into the bin in which they are accumulated. Note, said corn kernel accumulation bin is standard on combines. Typical existing combine systems further comprise means for ejecting cobs and unavoidable chaff onto the field being harvested.

What is new in the present invention combine system is that the whole cobs, from which corn kernels have been removed, are directed into a cross-auger that feeds them into a flow of air, which in turn forces them into a combine system mounted second bin in which they are accumulated. The accompanying unavoidable chaff is blown away from the cobs, and ejected onto the field as the combination of cobs and unavoidable chaff is directed toward said cross-auger, by another metered flow of air. Note, the separation of the whole cobs from the unavoidable chaff is dependent on establishing said air flow which sweeps away the lighter unavoidable chaff, but not the heavier whole cobs, and the Inventors consider the presence of adjustable means for controlling said air flow velocity that selectively ejects the unavoidable chaff as an important aspect of the present invention system. The preferred approach to controlling said unavoidable chaff ejecting air flow is by causing a centrifugal fan produced flow of air to pass through a constriction area, which serves to increase its velocity. Of course too high an air flow velocity would also eject the whole cobs, along with the unavoidable chaff, onto the field. Fortunately there is a range of air flow velocities which work very well, and the present invention provides air flow velocity adjustment, in the form of an adjustable position "ceiling" to enable providing air flows within said range. Typically utilized air flow velocities are in the range of five (5) to six (6) meters per second.

Said whole cob accumulation bin, in combination with a sieve for receiving essentially all whole cobs and chaff entered to a combine, in further combination with a cross-auger and air flow production means, which elements cooperate in use to enter whole cobs into said cob accumulation bin, all said elements being implemented as integral components in a combine system, has not previously been known, to the Inventor's knowledge. This is particularly true where the sieve utilized to receive whole cobs an unavoidable chaff is an added second sieve, (rather than the sieve which comes standard in combines, and which has holes therethrough sized to allow corn kernels to fall therethrough), which second sieve has holes therethrough which are sized to allow whole cobs to fall therethrough. Said present invention combine system can further include means for directing whole cobs which do not pass through said second sieve with openings therein large enough to allow whole cobs to pass therethrough as they pass thereover, back atop thereof as many times as required to affect their intended processing. A cross-auger re-cycling means is the preferred system realization.

A present invention can then be recited as a combine system for receiving ears of corn and unavoidable chaff, (eg. corn husks and stalks etc.), during harvest, and providing corn kernels to a first accumulation bin and whole cobs from which most corn kernels have been removed to a second accumulation bin, while ejecting substantially all unavoidable chaff from said combine system, the improvement being the presence, on said combine system, of said second accumulation bin in combination with means for receiving and transporting whole cobs, from which most corn kernels have been removed, into said second accumulation bin, said second accumulation bin being directly affixed to said combine system.

The means for receiving and transporting whole cobs from which most corn kernels have been removed to said second accumulation bin comprises:

means for accepting essentially all unavoidable chaff and whole cobs from which most corn kernels have been removed;

a means for creating a flow of air in combination with a means for directing said flow of air into said second accumulation bin; and means for directing said whole cobs from which most corn kernels have been removed, from said means for accepting essentially all unavoidable chaff and whole cobs from which most corn kernels have been removed, into said flow of air which transports said whole cobs from which kernels have been removed, into said second accumulation bin.

The preferred means for accepting unavoidable chaff and cobs from which most corn kernels have been removed, comprises at least one sieve, and a flow of air of appropriate velocity therethrough which serves to separate cobs from unavoidable chaff accepted thereupon. The present invention further comprises a means, (eg. centrifugal fan), for causing said flow of air of appropriate velocity through said at least one sieve.

Said combine system, when of a Conventional-type, comprises a straw-walker which accepts whole cobs from which corn kernels have been removed along with said corn kernels and unavoidable chaff, allows said corn kernels to drop through said straw-walker as they are moved along thereby, and onto a sieve which has openings therein large enough to let said corn kernels pass therethrough, but not large enough to let whole cobs pass therethrough. Said Conventional combine system provides said whole cobs from which corn kernels have been removed along with said unavoidable chaff to a straw chopper which rotates in a direction so as to direct said whole cobs from which corn kernels have been removed along with said unavoidable chaff into said combine system and onto said means for receiving and transporting whole cobs from which most corn kernels have been removed to said second accumulation bin. It is noted that said straw chopper rotation direction is opposite to what is typically used in Conventional combines which are not modified by the present invention, and this is a distinguishing difference of the present invention. Said means for receiving and transporting whole cobs from which most corn kernels have been removed to said second accumulation bin comprises means for accepting essentially all unavoidable chaff and whole cobs from which most corn kernels have been removed, said means for accepting essentially all unavoidable chaff and whole cobs from which most corn kernels have been removed comprising a sieve with openings therein of a sufficient dimension to allow whole cobs to pass therethrough.

Said combine system, when Rotor-type, has the rotor rotation velocity set to project corn kernels to a sieve with openings therein large enough to let said corn kernels pass therethrough, but not large enough to let whole cobs pass therethrough. Simultaneously whole cobs and unavoidable chaff can be projected onto a sieve which has openings therein large enough to let said whole cobs pass therethrough, but not large enough to let most unavoidable chaff pass therethrough.

In any embodiment, the preferred means for:

directing said cobs from which most corn kernels have been removed from said means for accepting unavoidable chaff and cobs from which most corn kernels have been removed, into said air flow which transports said cobs from which most corn kernels have been removed, into said second accumulation bin, is a cross-auger located adjacent to said means for accepting unavoidable chaff and corn cobs from which most corn kernels have been removed.

A present invention system, when separate from a combine, can be described as a system for cleaning whole cobs from which essentially all corn kernels have been removed, of any accompanying unavoidable chaff comprising:

means for receiving and transporting whole cobs from which most corn kernels have been removed, said means for receiving and transporting whole cobs from which most corn kernels have been removed comprising:

means for accepting unavoidable chaff and whole cobs from which most corn kernels have been removed comprising at least one sieve with openings therein large enough to allow whole cobs to pass therethrough;

a means for creating a flow of air in combination with a means for directing said flow of air through said at least one sieve with openings therein large enough to allow whole cobs to pass therethrough; and means for directing said whole cobs from which most corn kernels have been removed, from said means for accepting unavoidable chaff and whole cobs from which most corn kernels have been removed, into said flow of air which transports said whole cobs from which kernels have been removed.

Said system for cleaning whole cobs from which essentially all corn kernels have been removed, from accompanying unavoidable chaff, can provide that:

said means for directing said whole cobs from which most corn kernels have been removed from said means for accepting unavoidable chaff and whole cobs from which most corn kernels have been removed, into said flow of air which transports said whole cobs from which kernels have been removed, comprise a cross-auger positioned to receive whole cobs which pass through said means for accepting unavoidable chaff and whole cobs from which most corn kernels have been removed, which comprises at least one sieve with openings therein large enough to allow whole cobs to pass therethrough. Said system for cleaning whole cobs from which essentially all corn kernels have been removed from any accompanying unavoidable chaff, can further include means for directing whole cobs which do not pass through said sieve with openings therein large enough to allow whole cobs to pass therethrough as they pass thereover, back atop thereof as many times as required to affect intended processing. Again, a cross-auger is the preferred system realization of such a re-circulation system.

A present invention method of receiving ears of corn comprising corn kernels on whole cobs, and unavoidable chaff, (eg. corn husks and stalks etc.), during harvest, and providing corn kernels to a first accumulation bin and whole cobs from which most corn kernels have been removed to a second accumulation bin, while ejecting substantially all unavoidable chaff, can be recited as comprising the steps of:

a. providing a combine system characterized by comprising:

means for accepting essentially all unavoidable chaff and whole cobs from which most corn kernels have been removed;

means for creating a flow of air in combination with said means for accepting said unavoidable chaff and whole cobs from which most corn kernels have been removed;

a means for creating a flow of air in combination with a means for directing said flow of air into said second accumulation bin; and means for directing said whole cobs from which most corn kernels have been removed, from said means for accepting essentially all unavoidable chaff and whole cobs from which most corn kernels have been removed, into said flow of air which transports said whole cobs from which kernels have been removed, into said second accumulation bin;

b. causing ears of corn comprising corn kernels on whole cobs, and unavoidable chaff, during harvest to enter said combine system and causing said:

means for creating a flow of air in combination with means for directing said flow of air into said second accumulation bin, to create a flow of air;

c. causing corn kernels to be removed from the whole cobs;

d. causing unavoidable chaff and whole cobs from which most corn kernels have been removed to be placed onto said means for accepting unavoidable chaff and whole cobs from which most corn kernels have been removed;

e. causing said whole cobs from which most corn kernels have been removed to exit said means for accepting unavoidable chaff and whole cobs from which most corn kernels have been removed, and enter said means for directing said whole cobs from which most corn kernels have been removed into said means for directing said whole cobs from which most corn kernels have been removed from said means for accepting unavoidable chaff and whole cobs from which most corn kernels have been removed into said air flow which transports said whole cobs from which most corn kernels have been removed, into said second accumulation bin;

such that said whole cobs from which most corn kernels have been removed enter into said flow of air which transports said whole cobs from which most corn kernels have been removed, into said second accumulation bin, and are deposited into said second accumulation chamber.

Said method typically further comprises the step of causing said unavoidable chaff to be ejected.

A more rigorous recitation of a present invention method of receiving corn kernels on whole cobs, and unavoidable chaff, during harvest, and providing corn kernels to a first accumulation bin and whole cobs from which most corn kernels have been removed to a second accumulation bin, while ejecting substantially all unavoidable chaff, comprises:

a. providing a combine system which comprises means for receiving ears of corn comprising corn kernels on whole cobs, and unavoidable chaff during harvest, separating corn kernels from whole cobs, and providing said corn kernels to a first accumulation bin and said whole cobs from which most corn kernels have been removed to a second accumulation bin, while ejecting substantially all unavoidable chaff from said combine system, said first and second accumulation bins being affixed to said combine system;

said combine system being characterized by comprising:

means for accepting essentially all unavoidable chaff and whole cobs from which most corn kernels have been removed;

means for creating a flow of air in combination with said means for accepting said unavoidable chaff and whole cobs from which most corn kernels have been removed;

a means for creating a flow of air in combination with a means for directing said flow of air into said second accumulation bin; and means for directing said whole cobs from which most corn kernels have been removed, from said means for accepting essentially all unavoidable chaff and whole cobs from which most corn kernels have been removed, into said flow of air which transports said whole cobs from which kernels have been removed, into said second accumulation bin;

b. causing corn kernels on whole cobs, and unavoidable chaff, during harvest to enter said combine system and causing both said:

means for creating a flow of air in combination with said means for accepting said unavoidable chaff and whole cobs from which most corn kernels have been removed; and said means for creating a flow of air in combination with means for directing said flow of air into said second accumulation bin, to create separate flows of air;

c. causing corn kernels to be removed from the whole cobs;

d. causing unavoidable chaff and whole cobs from which most corn kernels have been removed to be placed onto said means for accepting unavoidable chaff and whole cobs from which most corn kernels have been removed;

simultaneously practicing steps e. and f., wherein steps e. and f. are:

e. causing said whole cobs from which most corn kernels have been removed to exit said means for accepting unavoidable chaff and whole cobs from which most corn kernels have been removed, and enter said means for directing said whole cobs from which most corn kernels have been removed into said means for directing said whole cobs from which most corn kernels have been removed from said means for accepting unavoidable chaff and whole cobs from which most corn kernels have been removed into said air flow which transports said whole cobs from which most corn kernels have been removed, into said second accumulation bin;

f. causing said unavoidable chaff to be ejected from said combine system means by being carried in a flow of air created by said means for creating a flow of air in combination with said means for accepting said unavoidable chaff and whole cobs from which most corn kernels have been removed;

such that said unavoidable chaff is ejected from said combine system by being carried in a flow of air created by said means for creating a flow of air in combination with said means for accepting said unavoidable chaff and whole cobs from which most corn kernels have been removed; and such that said whole cobs from which most corn kernels have been removed enter into said flow of air which transports said whole cobs from which most corn kernels have been removed, into said second accumulation bin, and are deposited into said second accumulation chamber.

It should be appreciated that specification of a second accumulation bin does not preclude there being more than two accumulation bins, a plurality of which are mounted to a combine system and in use are utilized to store whole cobs.

The present invention will be better understood by reference to the Detailed Description Section of this Specification, in conjunction with the Drawings.

SUMMARY

It is therefore a primary purpose and/or objective of the present invention to provide a whole cob cleaning system separate from a combine system, or a Conventional or Rotary combine system which comprises a plurality of bins in combination with means for harvesting corn, separating corn kernels from whole cobs (shelling) and directing the corn kernels and whole cobs to separate bins for accumulation therewithin, wherein said system is characterized by comprising:

means for accepting essentially all unavoidable chaff and whole cobs from which most corn kernels have been removed;

means for creating a flow of air in combination with said means for accepting said unavoidable chaff and whole cobs from which most corn kernels have been removed;

a means for creating a flow of air in combination with a means for directing said flow of air into said second accumulation bin; and means for directing said whole cobs from which most corn kernels have been removed, from said means for accepting essentially all unavoidable chaff and whole cobs from which most corn kernels have been removed, into said flow of air which transports said whole cobs from which kernels have been removed, into said second accumulation bin.

It is another purpose and/or objective of the present invention to provide a combine system characterized by comprising a means for accepting essentially all unavoidable chaff and whole cobs from which most corn kernels have been removed, said means being a sieve with openings therein of a sufficient dimension to allow whole cobs to pass therethrough.

It is another purpose of the present invention to disclose a Conventional combine system with a straw chopper therein which is caused to rotate so as to project whole cobs and unavoidable chaff back into said Conventional combine system and onto a means for accepting essentially all unavoidable chaff and whole cobs from which most corn kernels have been removed and which are delivered thereto by a straw-walker, instead of rotating in a typical opposite direction which expels said whole cobs and unavoidable chaff to a field.

It is another purpose and/or objective of the present invention to provide description of the methodology of use of said present invention systems.

Further purposes and/or objectives of the present invention will become apparent from a reading of the Specification.

DETAILED DESCRIPTION

Figure 1A:
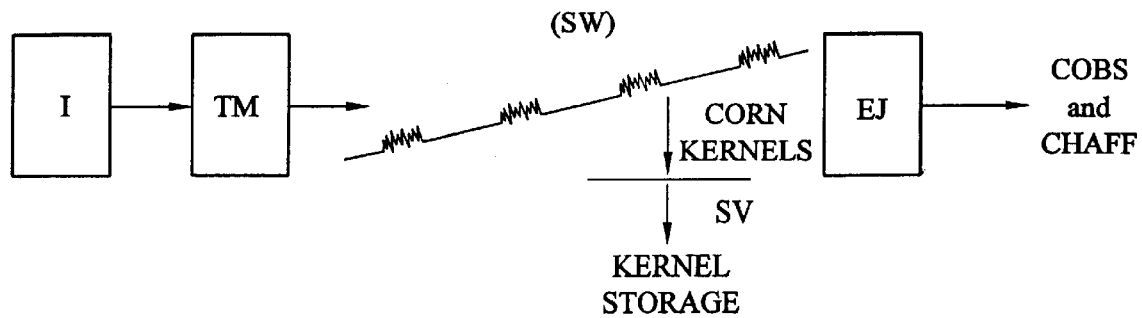
FIGS. 1a and 1b show prior art representations of Conventional and Rotary combines.
Figure 1B:
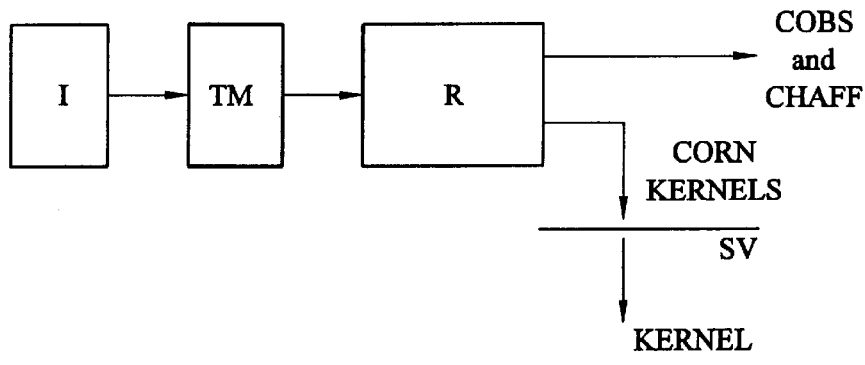

Turning now to the Drawings, it is generally noted that FIGS. 1a and 1b demonstrate functional prior art representations of Conventional and Rotary combines.

FIG. 1a demonstrates a Conventional combine as functionally comprising Input means (I), threshing means (TM), a straw-walker (SW), a sieve (SV) and an ejection means (EJ). In use ears of corn and chaff are entered via the input means (I) and corn kernels are shelled from the whole cobs. The corn kernels, whole cobs and chaff are then entered to straw walker (SW). Corn kernels exit straw-walker and onto and through sieve (SV) and are then entered to a storage bin therefore. The whole cobs and chaff enter the ejector (EJ) and are ejected to the field.

FIG. 1b demonstrates a rotary combine as functionally combining Input means (I), threshing and separating means with rotor (R), a sieve (SV) and an ejection means (EJ). In use ears of corn and chaff are entered via the input means (I) and corn kernels are threshed and then separated from the whole cobs and chaff by rotor (R). The corn kernels, whole cobs and chaff are then entered to rotor (R). Corn kernels exit the rotor (R) and onto and through sieve (SV) and are then entered to a storage bin therefore. The whole cobs and chaff enter ejector (EJ) and are ejected to the field.

Figure 1C:
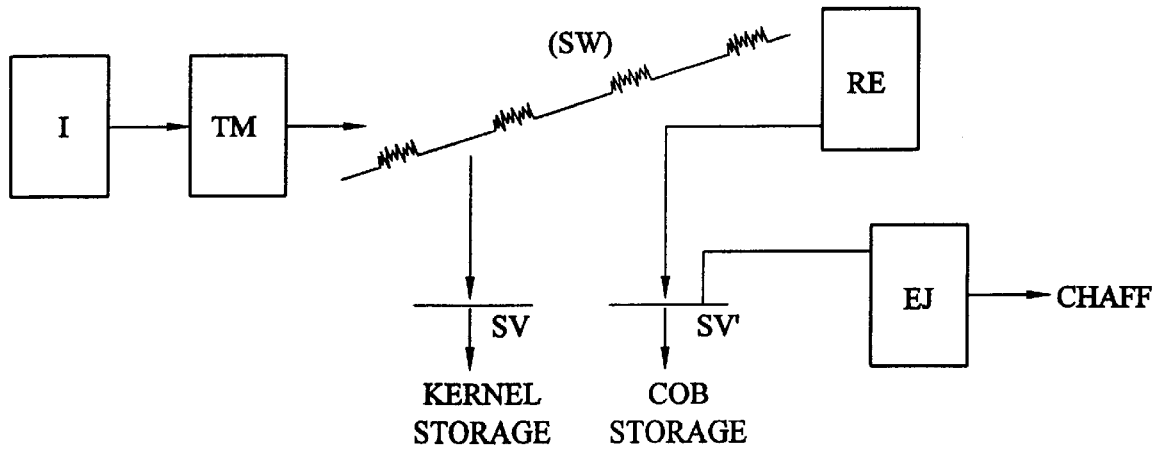
FIG. 1c shows a present invention modified Conventional combine.

FIG. 1c functionally demonstrates a present invention modified Conventional combine. Note that instead of whole cobs and chaff entering an ejector, they enter a recycler (RE), (eg. a modified straw-chopper), and are caused to be placed atop a second sieve (SV'), through which second sieve (SV') the whole cobs can fall and be entered into a storage bin therefore. The chaff is ejected by ejection means (EJ) onto the field. It is noted that the straw-walker does not require whole cob size holes be entered thereinto to enable whole cobs to be placed atop a sieve, thus the present invention FIG. 1c embodiment does not require Conventional combines to be modified.

Figure 1D:
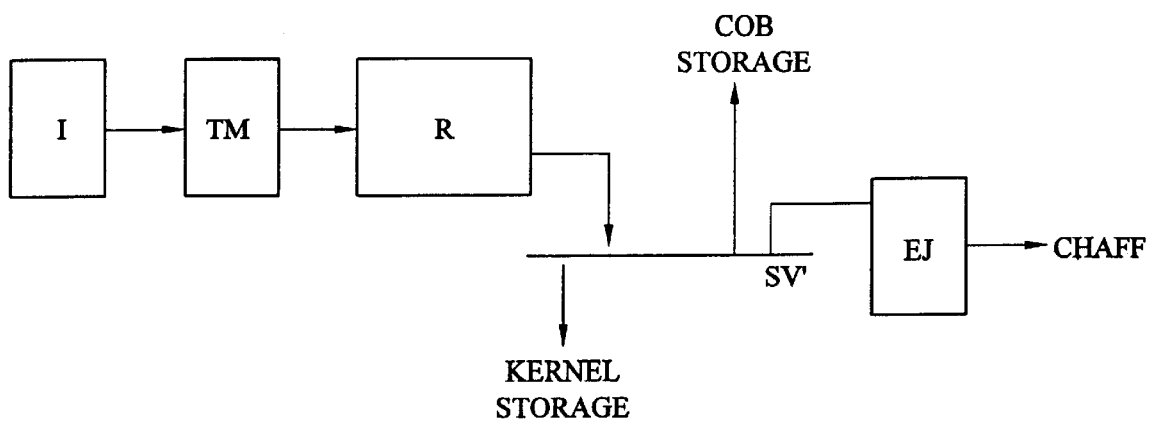
FIGS. 1d and 1e show present invention modified Rotary combines.

FIG. 1d functionally demonstrates a present invention modified Rotary combine. In use rotor (R) causes all corn to be placed atop sieve (SV) and whole cobs and chaff are caused, by said ejector (EJ) to be placed atop sieve (SV). Corn kernels pass through said sieve (SV) and are directed into a storage bin therefore, while whole cobs are directed over the surface of said sieve (SV) into a means which directs them into a whole cob storage bin. Chaff is ejected onto the field.

Figure 1E:
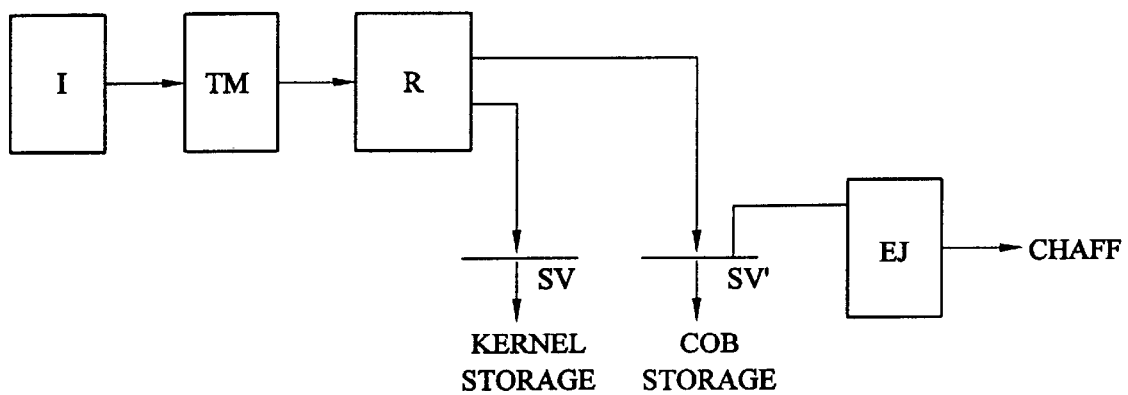

FIG. 1e functionally demonstrates a second version of a present invention Rotary combine, which is very similar to that in FIG. 1d except for the presence of a second sieve (SV'). In use ejector (EJ) causes corn kernels to be placed atop sieve (S) and whole cobs and chaff atop said second sieve (SV'). Whole cobs are directed over the surface of said sieve (SV) into a means which directs them into a whole cob storage bin, (could be directed upward in alternative). Chaff is ejected onto the field.

It is noted that in embodiments wherein a single sieve (SV) is present, that the sieve has holes therethrough large enough for corn kernels to pass, but not whole cobs. In said embodiments the whole cobs are caused to pass over the surface of said single sieve (SV) and into a conveyor means, (eg. an auger which direct said whole cobs into an air flow), which directs said whole cobs to a storage bin therefore. However, where a second sieve (SV') is present and used to handle whole cobs and unavoidable chaff, said second sieve (SV') has holes therein which are large enough for whole cobs, but not most unavoidable chaff to pass through. While most whole cobs will drop through said second sieve (SV') on a single pass thereover, it is possible for a whole cob to pass over such a second sieve (SV') in an orientation cross-wise with respect to the orientation of the holes in said second sieve (SV'). The present invention therefore provides for a re-cycling of such whole cobs back onto the second sieve (SV') for a second or more pass thereover. Lighter unavoidable chaff which is deposited atop a second sieve (SV') is continuously ejected onto the field by a flow of air upward through said second sieve (SV').

FIGS. 1a–1e were provided to aid with functional understanding of existing and present invention systems in the absence of "cluttering" combine related elements. For better insight, however, FIGS. 2–11 show present invention systems implemented into actual Conventional or Rotor combine systems.

Figure 2:
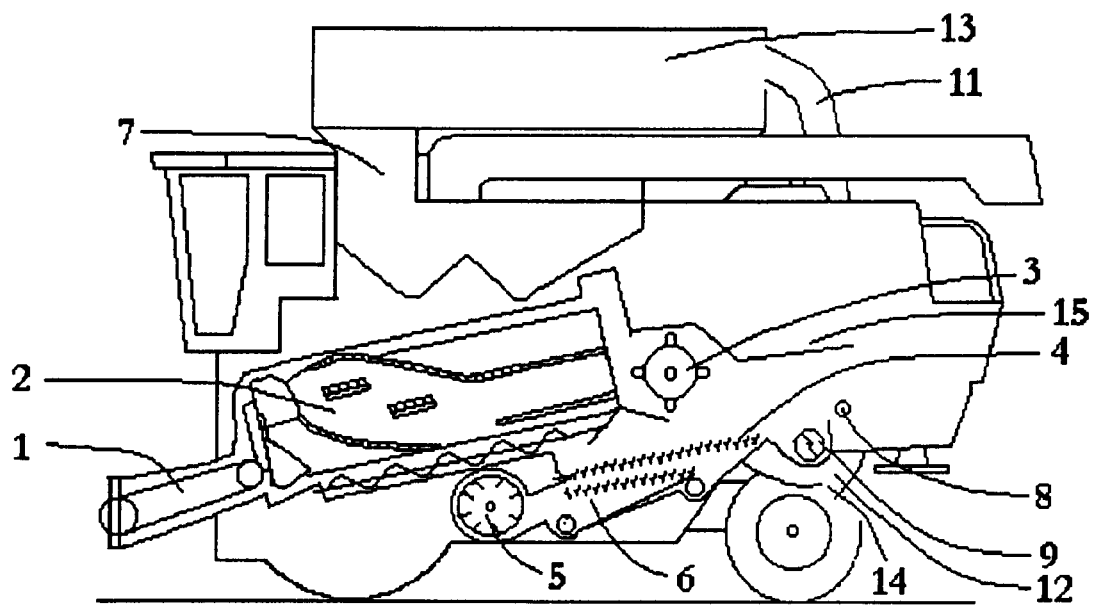
FIG. 2 shows a left side elevational view of a preferred embodiment of the present invention as functionally integrated into a combine system, with particular focus on pneumatic means to separate whole cobs from unavoidable chaff and for delivering whole cobs to a bin.
Figure 3:
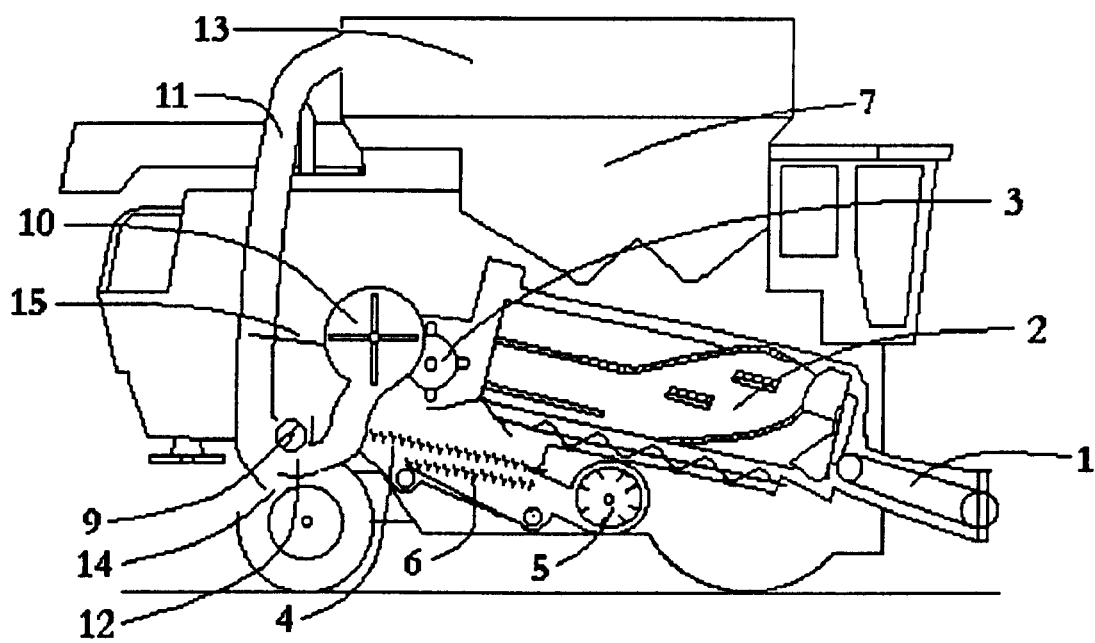
FIG. 3 shows a right side elevational view of a preferred embodiment of the present invention as functionally integrated into a combine system with particular focus on pneumatic means for conveying whole cobs.
Figure 4:
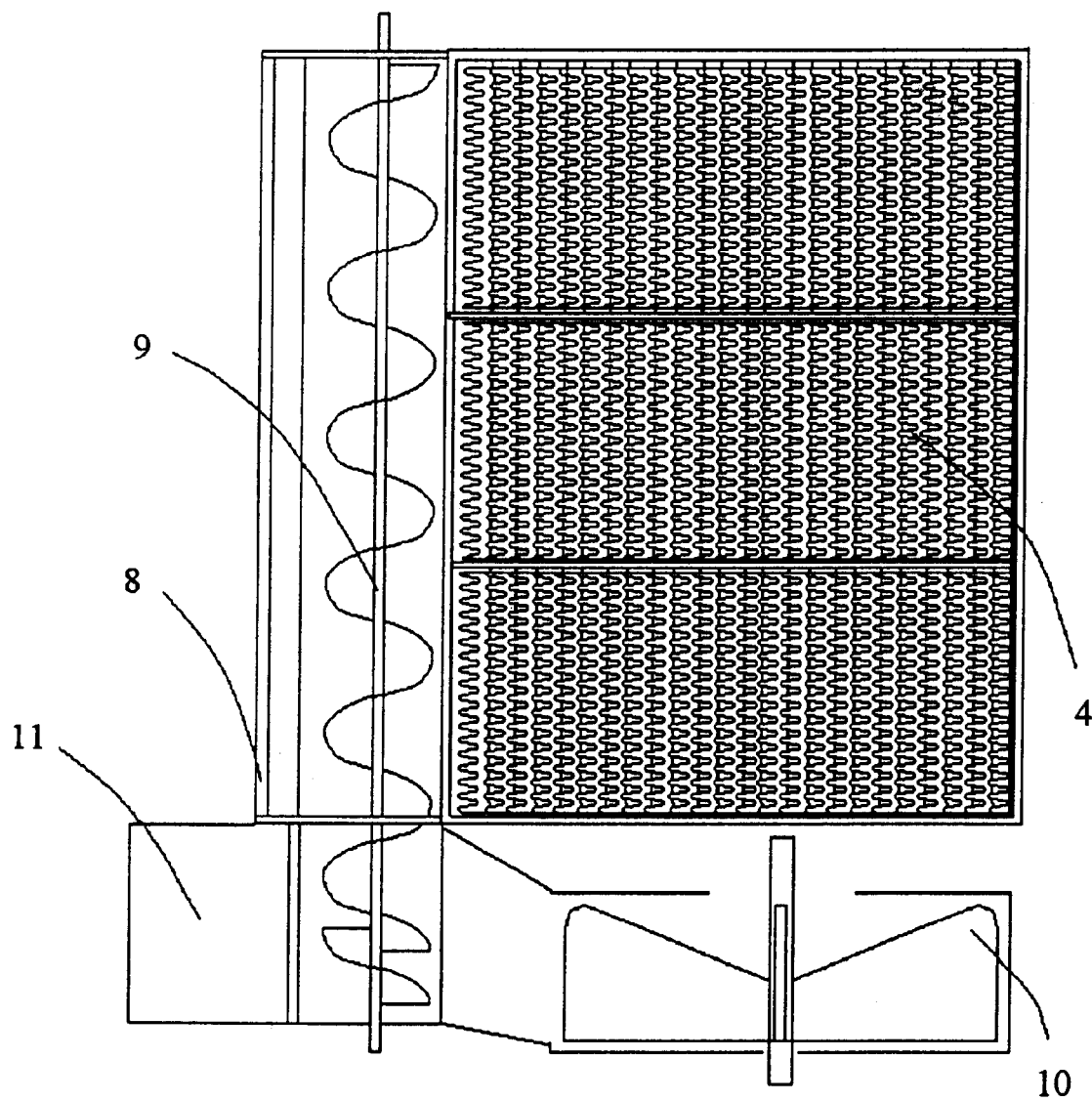
FIG. 4 shows a top view of a preferred embodiment of the present invention means for use in separating whole cobs from unavoidable chaff and in conveying whole cobs to a bin, as separate from a combine system.

FIG. 2 shows a left side elevational view and FIG. 3 a right side elevational view a preferred embodiment of the present invention as it is functionally integrated into a combine system. FIG. 4 shows a convenient top view of a preferred embodiment of the present invention means for use in separating whole cobs from unavoidable chaff and in conveying whole cobs to a bin, comprising sieve (4), auger (9) air duct (11) and whole cob accumulation bin (13). Note, FIG. 3 shows what is shown in FIG. 4, as FIG. 4 would appear as viewed from its lower aspect. That is, the sieve (4) projects into the page in FIG. 3. It will be beneficial, while reading the directly following description of the preferred embodiment of the present invention, to make various referral to FIGS. 2, 3 and 4 in order to appreciate the three-dimensional configuration described.

It is also noted that while two vertically related sieves, (eg. (4) and (6) in FIGS. 2 and 3 are generally shown), more than two vertically oriented sieves can be functionally present within any embodiment of the present invention as integrated in a combine system, and remain within the scope of the present invention.

Continuing, in use, ears of corn enter through feeder housing (1) and are shelled by single or multiple rotary cylinders (2). Cobs and large unavoidable chaff exit out the back of said rotary cylinders (2) and into discharge beater (3) The discharge beater (3) serves to toss whole cobs and unavoidable chaff onto sieve (4). Shelled corn, and small unavoidable chaff, are also conveyed onto sieve (4), but via falling through the cylinder's cage.

Clean grain fan (5) supplies a flow of air through sieves (4) and (6), which causes separation of unavoidable chaff from corn kernels. Under the influence of gravity, said corn kernels reach a higher terminal velocity than does unavoidable chaff, and so fall through sieves (4) and (6) and are conveyed into accumulation bin (7). Heavier materials yet, namely the whole cobs, remain on the sieve (4) and because it is caused to oscillate, move into the cross-auger (9), which is located between sieve (4) and cleaner (8). During use, said cross-auger (9) serves to accept whole cobs which fall there-in-to from said sieve (4), and transports them to a pneumatic whole cob carrying system which comprises a centrifugal blower (10), an air duct (11) and bin (13). Whole cobs are fed into the air duct (11) by the cross-auger (9) at a venturi point (12) where air flow starts to flow upward in said air duct (11).

As best appreciated by reference to FIG. 2, ceiling (15) is present and adjustable in position to allow increasing the flow rate of air through sieve (4) to the point that unavoidable chaff is lifted thereby, but corn kernels are not. (Typically ceiling (15) is set at between ten (10) to twenty (20) inches above sieve (4)). Air blowing through sieve (4) causes unavoidable chaff to exit the combine system, and cleaner (8) prevents build-up thereof as said unavoidable chaff exits and is deposited to the field. Clean-out duct (14) allows preventing air duct (11) from becoming clogged, and is located below cross-auger (9).

Figure 5:
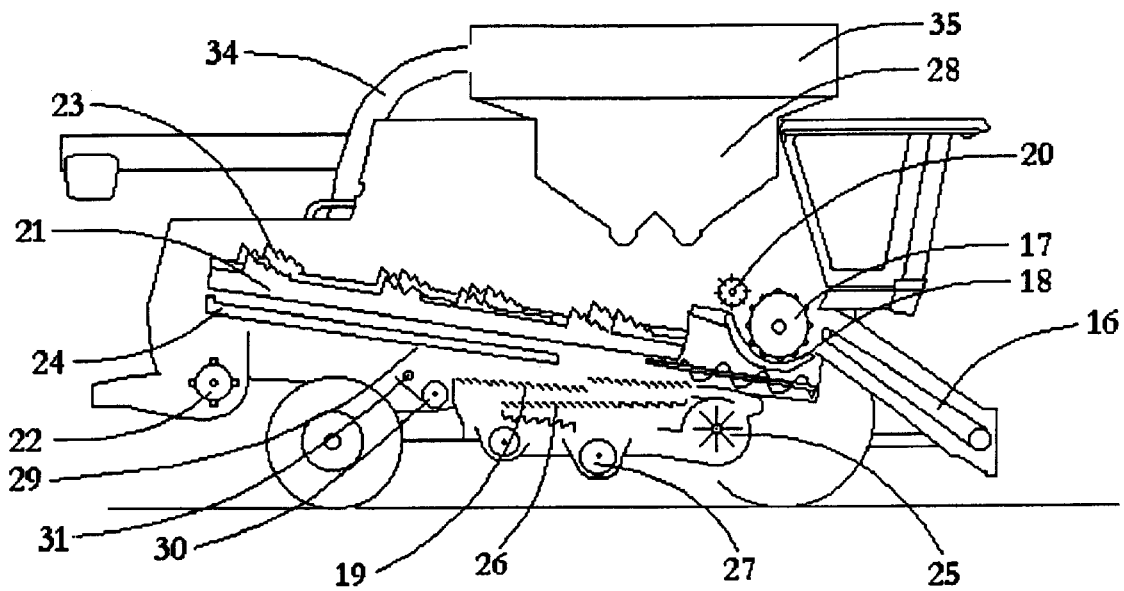
FIG. 5 shows a right side elevational view of an alternative embodiment of the present invention as functionally integrated into a combine system.
Figure 6:
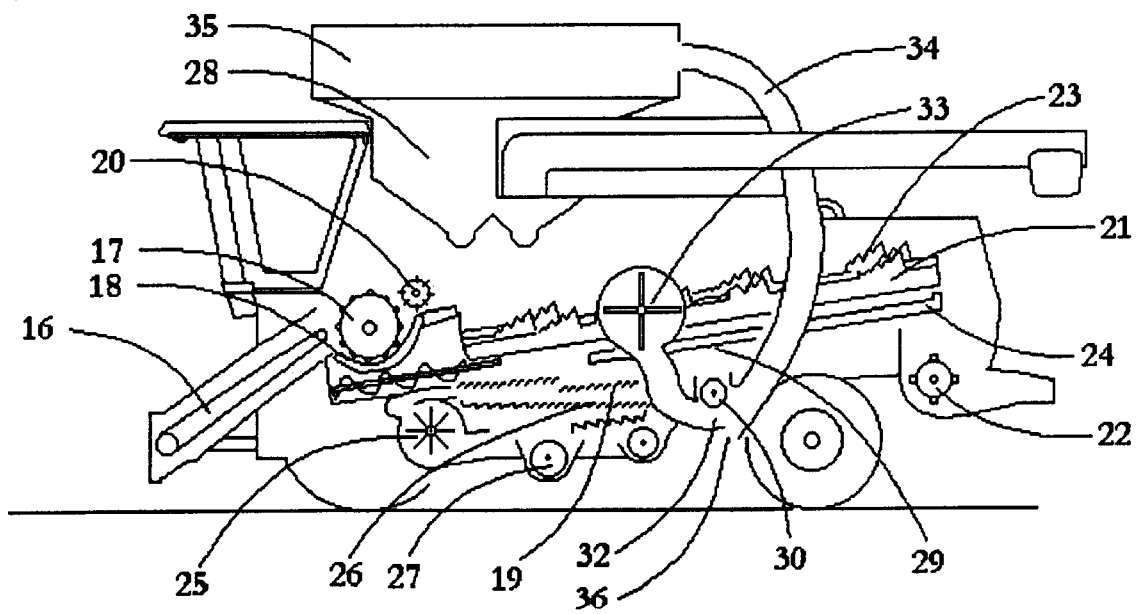
FIG. 6 shows a left side elevational view of an alternative embodiment of the present invention as functionally integrated into a combine system.

FIGS. 5 and 6 show an alternative embodiment of the present invention wherein, during use, feeder house (16)

conveys the ears of corn and unavoidable chaff into a conventional cylinder (17) which in use is caused to rotate, (clockwise as viewed in FIG. 3 and counter-clockwise as viewed in FIG. 6). Said action serves to shell corn and force corn kernels and smaller chaff through concave (18). Said corn kernels and smaller chaff fall through the concave (18) and are then conveyed to sieve (19). Cobs and larger chaff and some corn kernels, exit through the back of the conventional cylinder (17) and into beater (20). Beater (20) rotates and projects said material on to the straw-walkers (21). Said straw-walkers (21) oscillate causing shelled corn kernels and whole cobs to be shifted out as chaff is walked to the back of the combine system. Larger chaff exits out the back of the straw-walkers (21) and into straw chopper (22), which rotates clockwise to reduce said unavoidable chaff size, and eject it to out of the combine and onto the field. Now, materials which do not make it to, and exit via the straw chopper (22), fall through the straw-walkers (21). Removal of sections thereof about at least two (2) inches across, allow whole cobs to fall therethrough. Smaller sections enable selection of "cleaner" whole cobs, but results in more whole cobs being ejected onto the field by way of the straw chopper (22). Shelled corn kernels and whole cobs descend from the straw-walkers (21) to grain pan (24), which is angled downward toward the front of the combine system. Shelled corn kernels and whole cobs are caused to move to the front of sieve (19) by causing it to oscillate laterally. At the front of sieve (19) shelled corn kernels and whole cobs are united with material from concave (18). As sieve (19) oscillates laterally and conveys material toward the back of the combine system, air flow supplied from clean-grain fan (25) blows through sieves (19) and (26). This causes a cleaning action which separates unavoidable chaff and corn kernels. Said corn kernels fall through sieves (19) and (26) into clean-grain auger (27), which conveys the corn kernels into bin (28). Cobs are cleaned and collected as in the previously described preferred embodiment. Air from clean grain fan (25) lifts unavoidable chaff from sieve (19) toward ceiling (29). The pressure at ceiling (29) conveys said unavoidable chaff above cross-auger (30) and oscillating cleaner (31) and discharges it to the field. It is noted that the positioning, and even removal, of ceiling (29) is possible as means to adjust air flow. Cobs are conveyed backward by sieve (19) and proceed into cross-auger (30), which is located behind and below sieve (19). Said cross-auger (30) enters whole cobs into air flow provided by centrifugal blower (33), which air flow pulls whole cobs into air duct (34) at venturi (32). Air duct (24) then conveys whole cobs into bin (35). Clean-out duct (36) allows the air duct to be cleaned when the system is not operating.

Figure 7:
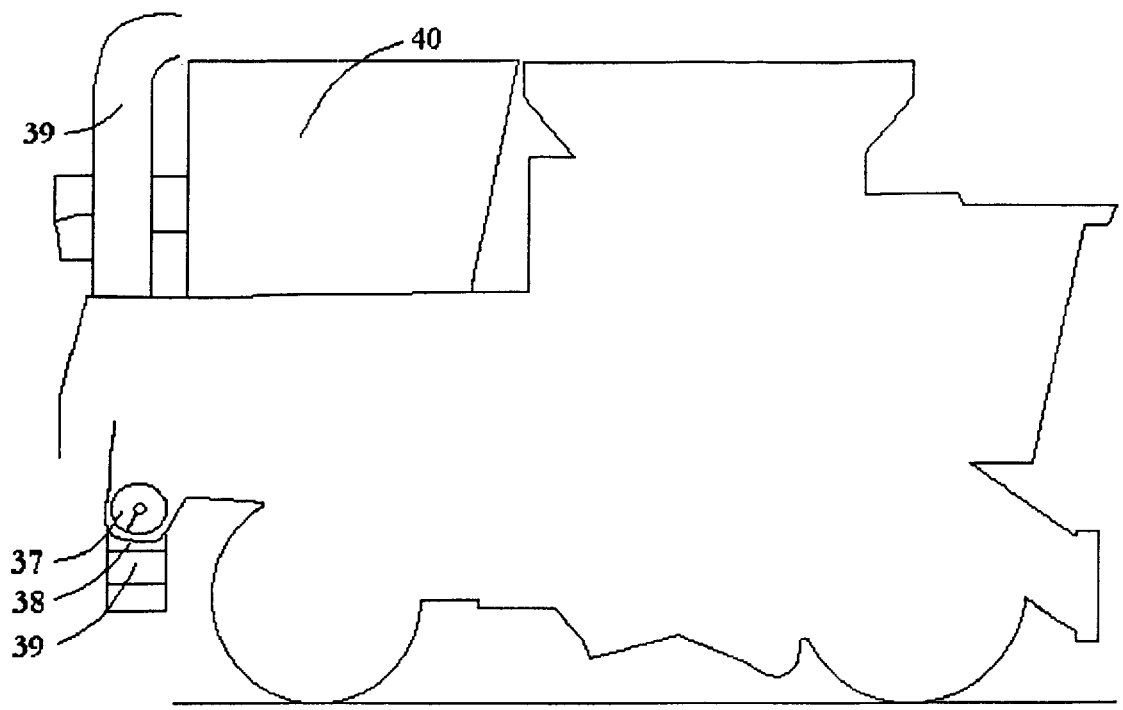
FIG. 7 shows a right side elevational view of an alternative whole cob bin and conveying system.
Figure 8:
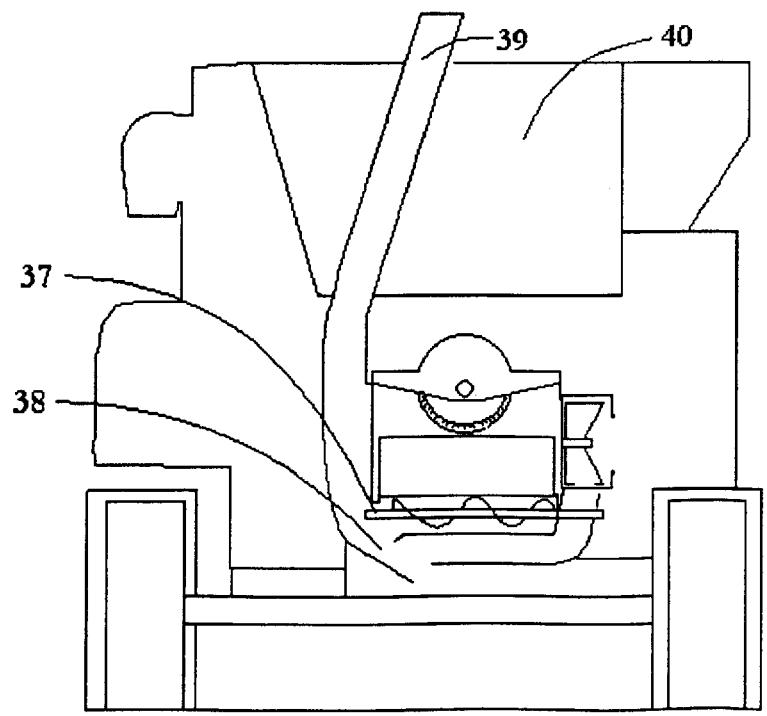
FIG. 8 shows a back elevational view of an alternative whole cob bin and conveying system.

FIGS. 7 and 8 show reconfigured cross-auger (37) and centrifugal blower air flow fed venturi (38) at the lower extent of air duct (39), in combination with whole cob accumulation bin (40). Said reconfigurations, and functional equivalents thereto are within the scope of the present invention.

Figure 9:
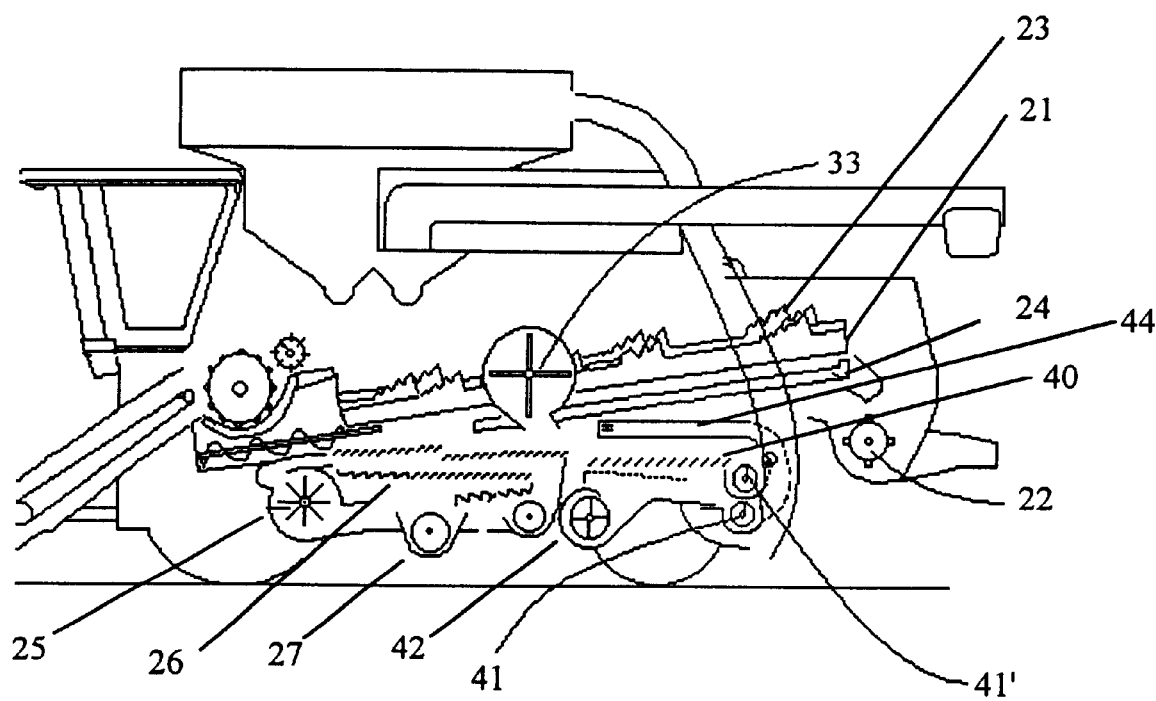
FIG. 9 shows a right side elevational view of an alternative embodiment of the present invention as functionally integrated into a Conventional combine system, (much as shown and described with respect to FIG. 4), said embodiment further containing a second sieve through which whole cobs can pass.
Figure 11:
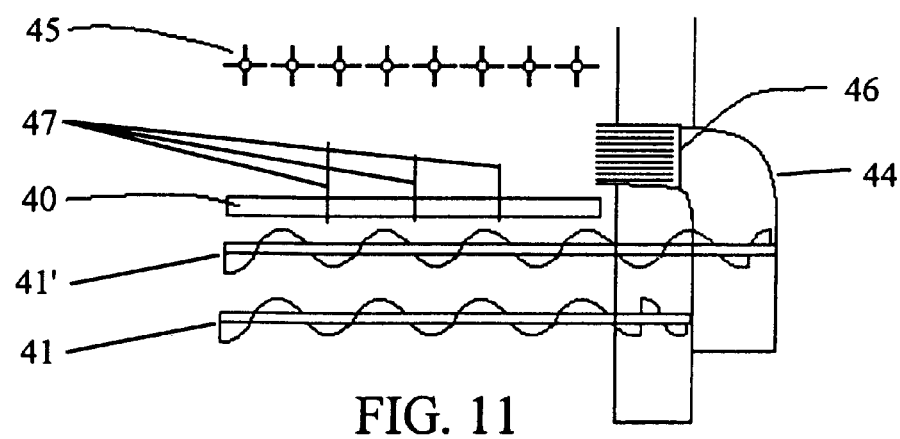
FIG. 11 shows a front elevational view of the whole cob recycling elements in the FIGS. 9 and 10 embodiment of the present invention as mounted in a Conventional combine.
Figure 10:
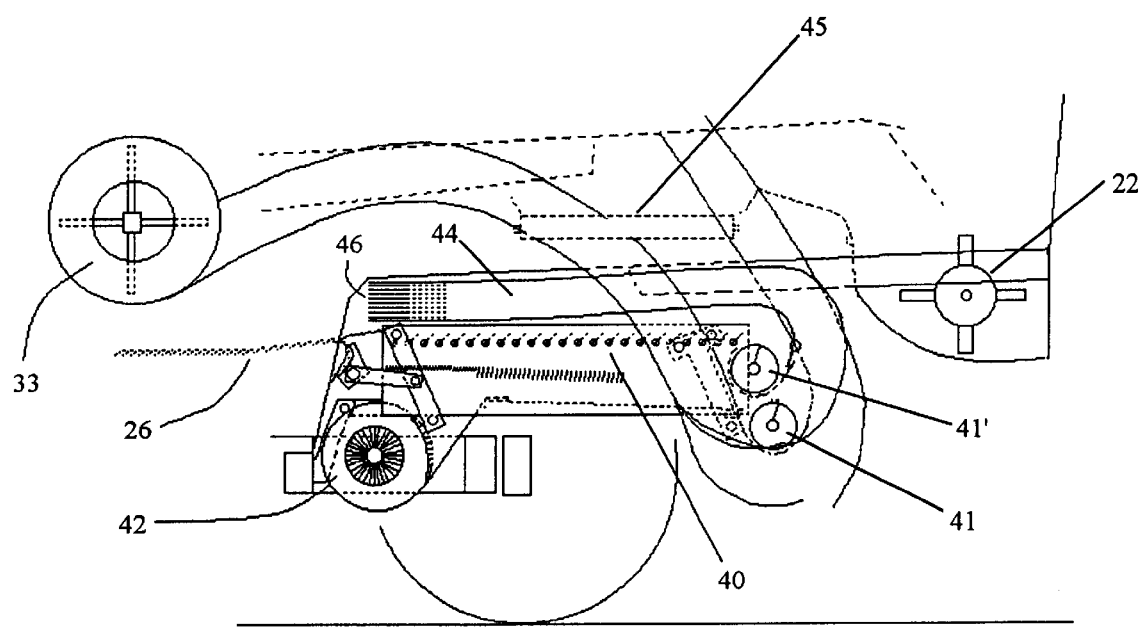
FIG. 10 shows the second sieve and accompanying elements FIG. 9 embodiment as viewed in frontal elevation.

FIG. 9 shows a right side elevational view of an alternative embodiment of the present invention as functionally integrated into a Conventional combine system, (much as shown and described with respect to FIG. 4). Said embodiment, however, further contains a second sieve (40) which comprises openings therein through which whole cobs can pass. FIG. 10 shows an expanded view of the elements in the region of the second sieve (40), and the accompanying elements in the FIG. 9 embodiment. FIG. 11 shows a front elevational view of whole cob recycling elements in the FIGS. 9 and 10 embodiment of the present invention as mounted in a Conventional combine. FIG. 11 is what one would view, looking into the Conventional combine from the left side of FIG. 10. One can easily coordinate FIGS. 10 and 11 by noting ejection point (46) in each and realizing that the system of FIG. 11 would project into the page in FIG. 10. For coordinated reference to the FIG. 4 embodiment, note the first sieve (26) location in FIGS. 4 and 10.

With simultaneous reference to FIGS. 9, 10 and 11, it is first to be appreciated that second sieve (40) can be embodied by formation from a multiplicity of slates, each with a size on the order of three (3) inches wide and spaced two-and-one-half (2.5) inches apart from one another. Generally, while the straw-walker (21) is as was described with respect to FIG. 4, it is necessary, to understand that straw chopper (22) is, in the FIG. 10 embodiment, caused to rotate counter-clockwise, thus projecting whole cobs and unavoidable chaff arriving thereat back into the Conventional combine and onto second sieve (40), rather than out of said Conventional combine. Continuing, centrifugal fan (42) causes a flow of air through said second sieve (40) which serves to eject unavoidable chaff entered atop thereof, while heavier whole cobs drop through said second sieve (40) and are directed by auger (41) into a flow of air which transports them into a cob storage bin, as was described with respect to earlier described Figures. Whole cobs and some unavoidable chaff which do not fall through said second sieve (40) are transported by return auger (41') and ejected back toward second sieve (44). The structure for this is best viewed in FIG. 11. Note that air and unavoidable chaff is blown out of the system, while whole cobs are delivered back onto the second sieve (40). Dividers (47) aid with even distribution of said returned whole cobs. Further note rotary-air-lock (45). Its purpose is to overcome the flow of air from turbine fan (42) which opposes re-entry of whole cobs onto second sieve (40) from ejection point (46). As best indicated in FIG. 11, multiple rotating blades in said rotary-air-lock (45) definitely direct whole cobs entered thereto onto said second sieve (40).

It is to be understood that as functionally demonstrated in FIG. 1e, the second sieve arrangement can also be utilized in a Rotary combine system.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A combine system for use in harvesting corn, said combine system comprising a framework having secured therewithin:
   means for receiving:
      ears of corn which comprise corn kernels on whole cobs,
      and accompanying unavoidable chaff;
   means for separating corn kernels from whole cobs;
   first and second accumulation bins;
   means for providing corn kernels to said first accumulation bin;
   means for receiving and transporting whole cobs from which most corn kernels have been removed to said second accumulation bin, and
   means for ejecting substantially all accompanying unavoidable chaff from said combine system;

the improvement being the presence of said second accumulation bin in combination with means for receiving and transporting whole cobs from which most corn kernels have been removed into said second accumulation bin;

said means for receiving and transporting whole cobs from which most corn kernels have been removed into said second accumulation bin, being positioned in said combine system to, during use, receive unavoidable chaff and whole cobs from which most corn kernels have been removed, from said means for separating corn kernels from whole cobs;

wherein said means for receiving and transporting whole cobs from which most corn kernels have been removed to said second accumulation bin comprises:

means for accepting unavoidable chaff and whole cobs from which most corn kernels have been removed;

means for creating a primary flow of air in combination with means for directing said primary flow of air into said second accumulation bin; and means for directing said whole cobs from which most corn kernels have been removed, from said means for accepting unavoidable chaff and whole cobs from which most corn kernels have been removed, into said primary flow of air which is provided by said means for creating a primary flow of air, which primary flow of air is directed into said second accumulation bin by said means for directing said primary flow of air into said second accumulation bin, such that, in use, unavoidable chaff and ears of corn which comprise corn kernels on whole cobs are entered into said combine system, said corn kernels are separated from said whole cobs therewithin by said means for separating corn kernels from whole cobs, and said unavoidable chaff and said whole cobs from which kernels have been removed are caused to be received by said means for receiving and transporting whole cobs from which most corn kernels have been removed, and said whole cobs from which most corn kernels have been removed are transported into said second accumulation bin by said primary flow of air.

2. A combine system as in claim 1, in which the means for accepting unavoidable chaff and whole cobs from which most corn kernels have been removed, comprises at least one sieve with openings therein large enough to allow whole cobs to pass therethrough, said at least one sieve with openings therein large enough to allow whole cobs to pass therethrough being positioned in said combine system so that unavoidable chaff and whole cobs from which most corn kernels have been removed which exit said means for separating corn kernels from whole cobs, become positioned on a top surface thereof.

3. A combine system as in claim 2, which further comprises a second sieve with holes therein large enough to allow corn kernels to pass therethrough, but not large enough to allow whole cobs and unavoidable chaff to pass therethrough, said second sieve with holes therein large enough to allow corn kernels to pass therethrough, but not large enough to allow whole cobs and unavoidable chaff to pass therethrough being positioned in said combine system so that corn kernels which exit said means for separating corn kernels from whole cobs arrive on a top surface thereof.

4. A combine system as in claim 2, which further comprises at least one selection from the group consisting of:

a. a means for causing a supplemental flow of air which flows through said at least one sieve with holes therein large enough to allow whole cobs to pass therethrough, such that in use said supplemental flow of air causes said unavoidable chaff caused to be present on said at least one sieve to guided toward ejection from said combine system;

b. a means for directing whole cobs, which do not quickly pass through said at least one sieve with openings therein large enough to allow whole cobs to pass therethrough, to continue to be presented to said at least one sieve with openings therein large enough to allow whole cobs to pass therethrough, rather than be ejected from said combine system.

5. A combine system as in claim 2, in which the means for directing said whole cobs from which most corn kernels have been removed, into said primary flow of air which transports said whole cobs from which most corn kernels have been removed, into said second accumulation bin comprises a cross-auger located adjacent to said means for accepting unavoidable chaff and whole cobs from which most corn kernels have been removed.

6. A method of receiving ears of corn comprising corn kernels on whole cobs, and unavoidable chaff, during harvest, and providing corn kernels to a first accumulation bin and whole cobs from which most corn kernels have been removed to a second accumulation bin, said method comprising the steps of:

a. providing a combine system for use in harvesting corn, said combine system comprising a framework having secured therewithin:

means for receiving:
ears of corn which comprise corn kernels on whole cobs,
and accompanying unavoidable chaff;

means for separating corn kernels from whole cobs;
first and second accumulation bins;
means for providing corn kernels to said first accumulation bin;
means for receiving and transporting whole cobs from which most corn kernels have been removed to said second accumulation bin, and
means for ejecting substantially all accompanying unavoidable chaff from said combine system;
the improvement being the presence of said second accumulation bin in combination with means for receiving and transporting whole cobs from which most corn kernels have been removed into said second accumulation bin;
said means for receiving and transporting whole cobs from which most corn kernels have been removed into said second accumulation bin, being positioned in said combine system to, during use, receive unavoidable chaff and whole cobs from which most corn kernels have been removed, from said means for separating corn kernels from whole cobs;
wherein said means for receiving and transporting whole cobs from which most corn kernels have been removed to said second accumulation bin comprises:
means for accepting unavoidable chaff and whole cobs from which most corn kernels have been removed;
means for creating a primary flow of air in combination with means for directing said primary flow of air into said second accumulation bin; and
means for directing said whole cobs from which most corn kernels have been removed, from said means for accepting unavoidable chaff and whole cobs from which most corn kernels have been removed, into said primary flow of air which is provided by said means for creating a primary flow of air, which primary flow of air is directed into said second accumulation bin by said means for directing said primary flow of air into said second accumulation bin, such that, in use, unavoidable chaff and ears of corn which comprise corn kernels on whole cobs are entered into said combine system, said corn kernels are separated from said whole cobs therewithin by said means for separating corn kernels from whole cobs, and said unavoidable chaff and said whole cobs from which kernels have been removed are caused to be received by said means for receiving and transporting whole cobs from which most corn kernels have been removed, and said whole cobs from which most corn kernels have been removed are transported into said second accumulation bin by said primary flow of air;

b. causing corn kernels on whole cobs, and unavoidable chaff, during harvest to enter said combine system;

c. causing said
means for creating a primary flow of air in combination with means for directing said primary flow of air into said second accumulation bin, to create a primary flow of air into said second accumulation bin;

d. causing corn kernels to be removed from the corn kernels on whole cobs entered to the combine system, by application of the means for separating corn kernels from whole cobs;

e. causing unavoidable chaff and whole cobs from which most corn kernels have been removed to be entered to said means for accepting unavoidable chaff and whole cobs from which most corn kernels have been removed;

d. causing said whole cobs from which most corn kernels have been removed to exit said means for accepting unavoidable chaff and whole cobs from which most corn kernels have been removed, and enter said means for directing said whole cobs from which most corn kernels have been removed into said means for directing said whole cobs from which most corn kernels have been removed, from said means for accepting unavoidable chaff and whole cobs from which most corn kernels have been removed into said primary air flow which transports said whole cobs from which most corn kernels have been removed, into said second accumulation bin;

such that said whole cobs from which most corn kernels have been removed enter into said primary flow of air which transports said whole cobs from which most corn kernels have been removed, into said second accumulation bin.

7. A method of receiving ears of corn comprising corn kernels on whole cobs, and unavoidable chaff, during harvest, and providing corn kernels to a first accumulation bin and whole cobs to a second accumulation bin while ejecting substantially all unavoidable chaff as in claim 6, which further comprises:

providing a means for creating a supplemental flow of air in combination with a means for directing said supplemental flow of air through said means for accepting unavoidable chaff and whole cobs from which most corn kernels have been removed, said supplemental flow of air being sufficient to eject unavoidable chaff from the combine system, but not sufficient to eject whole cobs; and said method further comprising the additional step of causing said unavoidable chaff to be ejected from said combine system.

8. A method of receiving ears of corn comprising corn kernels on whole cobs, and unavoidable chaff, during harvest, and providing corn kernels to a first accumulation bin and whole cobs from which most corn kernels have been removed to a second accumulation bin, while ejecting substantially all unavoidable chaff, said method comprising the steps of:

a. providing a combine system for use in harvesting corn, said combine system comprising a framework having secured therewithin:
means for receiving:
ears of corn which comprise corn kernels on whole cobs,
and accompanying unavoidable chaff;
means for separating corn kernels from whole cobs;
first and second accumulation bins;
means for providing corn kernels to said first accumulation bin; and
means for receiving and transporting whole cobs from which most corn kernels have been removed to said second accumulation bin, and
means for ejecting substantially all accompanying unavoidable chaff from said combine system;
the improvement being the presence of said second accumulation bin in combination with means for receiving and transporting whole cobs from which most corn kernels have been removed into said second accumulation bin;
said means for receiving and transporting whole cobs from which most corn kernels have been removed into said second accumulation bin, being positioned in said combine system to, during use, receive unavoidable chaff and whole cobs from which most corn kernels have been removed, from said means for separating corn kernels from whole cobs;
wherein said means for receiving and transporting whole cobs from which most corn kernels have been removed to said second accumulation bin comprises:
means for accepting unavoidable chaff and whole cobs from which most corn kernels have been removed;
means for creating a primary flow of air in combination with means for directing said primary flow of air into said second accumulation bin; and
means for directing said whole cobs from which most corn kernels have been removed, from said means for accepting unavoidable chaff and whole cobs from which most corn kernels have been removed, into said primary flow of air which is provided by said means for creating a primary flow of air, which primary
flow of air is directed into said second accumulation bin by said means for directing said primary flow of air into said second accumulation bin, such that, in use, unavoidable chaff and ears of corn which comprise corn kernels on whole cobs are entered into said combine system, said corn kernels are separated from said whole cobs therewithin by said means for separating corn kernels from whole cobs, and said unavoidable chaff and said whole cobs from which kernels have been removed are caused to be received by said means for receiving and transporting whole cobs from which most corn kernels have been removed, and said whole cobs from which most corn kernels have been removed are transported into said second accumulation bin by said primary flow of air;

said combine system further comprising a means for causing a supplemental flow of air in combination with said means for accepting unavoidable chaff and whole cobs from which most corn kernels have been removed, which which supplemental air flow causes said unavoidable chaff caused to be present on said means for accepting unavoidable chaff and whole cobs from which most corn kernels have been removed, to guided toward ejection from said combine system;

b. causing corn kernels on whole cobs, and unavoidable chaff, to enter said combine system;

c. causing both said means for creating a supplemental flow of air in combination with said means for accepting said unavoidable chaff and whole cobs from which most corn kernels have been removed, said supplemental flow of air being directed and sufficient to eject unavoidable chaff from said combine system, but not sufficient to so eject whole cobs; and said means for creating a primary flow of air in combination with means for directing said primary flow of air into said second accumulation bin, to create separate supplemental and primary flows of air;

d. causing corn kernels to be removed from the whole cobs by application of said means for separating corn kernels from whole cobs;

e. causing unavoidable chaff and whole cobs from which most corn kernels have been removed to be entered to said means for accepting unavoidable chaff and whole cobs from which most corn kernels have been removed;

simultaneously practicing steps f. and g., wherein steps f. and g. are:

f. causing said whole cobs from which most corn kernels have been removed to exit said means for accepting unavoidable chaff and whole cobs from which most corn kernels have been removed, and enter said means for directing said whole cobs from which most corn kernels have been removed into said means for directing said whole cobs from which most corn kernels have been removed, from said means for accepting unavoidable chaff and whole cobs from which most corn kernels have been removed and into said primary air flow which transports said whole cobs from which most corn kernels have been removed, into said second accumulation bin;

g. causing said unavoidable chaff to be ejected from said combine system means by being carried in said supplemental flow of air created by said means for creating a supplemental flow of air in combination with said means for accepting said unavoidable chaff and whole cobs from which most corn kernels have been removed;

such that said unavoidable chaff is ejected from said combine system by being carried out of said combine system in said supplemental flow of air created by said means for creating a supplemental flow of air; and such that said whole cobs from which most corn kernels have been removed are entered into said primary flow of air which transports said whole cobs from which most corn kernels have been removed, into said second accumulation bin.

9. A method of receiving ears of corn comprising corn kernels on cobs, and unavoidable chaff, during harvest, and providing corn kernels to a first accumulation bin and whole cobs from which most corn kernels have been removed to a second accumulation bin, while ejecting substantially all unavoidable chaff as in claim 8, in which the step of providing a means for accepting unavoidable chaff and whole cobs from which most corn kernels have been removed involves providing at least one sieve with openings therein sufficient to allow whole cobs from which most corn kernels have been removed to pass therethrough.

10. A combine system for receiving:

unavoidable chaff, and ears of corn which comprise corn kernels on whole cobs, and providing corn kernels to a first accumulation bin and whole cobs from which most corn kernels have been removed to a second accumulation bin, while ejecting substantially all unavoidable chaff from said combine system;

said combine system having functionally affixed to a framework thereof:

means for receiving unavoidable chaff and ears of corn;

means for removing corn kernels from ears of corn to provide whole cobs from which most corn kernels have been removed;

a straw chopper;

said first and second accumulation bins; and means for receiving and transporting whole cobs from which most corn kernels have been removed into said second accumulation bin;

such that in use said combine system is caused to receive unavoidable chaff in combination with ears of corn at said means for receiving unavoidable chaff and ears of corn; and such that said means for removing corn kernels from ears of corn to provide whole cobs from which most corn kernels have been removed, is caused to separate most corn kernels from said ears of corn, thereby providing whole cobs;

and such that said whole cobs from which corn kernels have been removed, along with said accompanying unavoidable chaff, are caused to be entered to said straw chopper, which straw chopper is caused to rotate in a direction so as to direct said whole cobs from which most corn kernels have been removed along with said accompanying unavoidable chaff into said combine system and onto said means for receiving and transporting whole cobs from which most corn kernels have been removed to said second accumulation bin;

said means for receiving and transporting whole cobs from which most corn kernels have been removed to said second accumulation bin comprising:

means for accepting unavoidable chaff and whole cobs from which most corn kernels have been removed, said means for accepting unavoidable chaff and whole cobs from which most corn kernels have been removed comprising at least one sieve with openings therein of a sufficient dimension to allow whole cobs to pass therethrough;

a means for creating a primary flow of air in combination with a means for directing said primary flow of air into said second accumulation bin;

means for directing said whole cobs from which most corn kernels have been removed, from said means for accepting unavoidable chaff and whole cobs from which most corn kernels have been removed, into said primary flow of air which transports said whole cobs from which kernels have been removed, into said second accumulation bin; and means for causing a supplemental flow of air through said at least one sieve which has holes therein of a sufficient dimension to allow whole cobs to pass therethrough, such that said supplemental flow of air causes said unavoidable chaff caused to be present on said at least one sieve which has holes therein of a sufficient dimension to allow whole cobs to pass therethrough, to be ejected from said combine system.

\* \* \* \* \*